(12) United States Patent
Woodard et al.

(10) Patent No.: US 8,430,327 B2
(45) Date of Patent: Apr. 30, 2013

(54) WIRELESS SENSING SYSTEM USING OPEN-CIRCUIT, ELECTRICALLY-CONDUCTIVE SPIRAL-TRACE SENSOR

(75) Inventors: Stanley E. Woodard, Hampton, VA (US); Bryant D. Taylor, Smithfield, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 564 days.

(21) Appl. No.: 11/671,089

(22) Filed: Feb. 5, 2007

(65) Prior Publication Data

US 2007/0181683 A1 Aug. 9, 2007

Related U.S. Application Data

(60) Provisional application No. 60/774,803, filed on Feb. 6, 2006.

(51) Int. Cl.
 *G06K 19/06* (2006.01)
 *G06K 7/08* (2006.01)
(52) U.S. Cl.
 USPC ............ 235/493; 235/449; 235/451; 235/492
(58) Field of Classification Search .................. 235/441, 235/449, 451, 492, 493
 See application file for complete search history.

(56) References Cited

U.S. PATENT DOCUMENTS

| | | | | |
|---|---|---|---|---|
| 5,291,180 | A * | 3/1994 | Reeb | 340/572.5 |
| 5,608,417 | A * | 3/1997 | de Vall | 343/895 |
| 5,892,425 | A | 4/1999 | Kuhn et al. | |
| 5,969,590 | A | 10/1999 | Gutierrez | |
| 6,147,606 | A * | 11/2000 | Duan | 340/572.7 |
| 6,194,987 | B1 | 2/2001 | Zhou et al. | |
| 6,304,083 | B1 | 10/2001 | Owens | |
| 6,348,391 | B1 | 2/2002 | Fattaruso | |
| 6,444,517 | B1 | 9/2002 | Hsu et al. | |
| 6,498,325 | B1 | 12/2002 | Akel et al. | |
| 6,573,818 | B1 | 6/2003 | Klemmer et al. | |
| 6,611,188 | B2 | 8/2003 | Yeo et al. | |
| 6,661,079 | B1 | 12/2003 | Bikulcius | |
| 6,696,953 | B2 * | 2/2004 | Qiu et al. | 340/572.3 |
| 6,838,970 | B2 | 1/2005 | Basteres et al. | |
| 6,853,079 | B1 | 2/2005 | Hopper et al. | |
| 6,922,126 | B1 | 7/2005 | Okamoto et al. | |
| 7,086,593 | B2 | 8/2006 | Woodard et al. | |
| 7,159,774 | B2 | 1/2007 | Woodard et al. | |
| 2004/0066296 | A1 * | 4/2004 | Atherton | 340/572.1 |
| 2005/0007239 | A1 * | 1/2005 | Woodard et al. | 340/10.2 |
| 2005/0012615 | A1 * | 1/2005 | Piccoli et al. | 340/572.1 |

* cited by examiner

*Primary Examiner* — Daniel Hess
(74) *Attorney, Agent, or Firm* — Robin W. Edwards

(57) ABSTRACT

A wireless sensing system includes a sensor made from an electrical conductor shaped to form an open-circuit, electrically-conductive spiral trace having inductance and capacitance. In the presence of a time-varying magnetic field, the sensor resonates to generate a harmonic response having a frequency, amplitude and bandwidth. A magnetic field response recorder wirelessly transmits the time-varying magnetic field to the sensor and wirelessly detects the sensor's response frequency, amplitude and bandwidth.

35 Claims, 4 Drawing Sheets

WIRELESS SENSING SYSTEM USING OPEN-CIRCUIT, ELECTRICALLY-CONDUCTIVE SPIRAL-TRACE SENSOR

ORIGIN OF THE INVENTION

This invention was made in part by an employee of the United States Government and may be manufactured and used by or for the Government of the United States of America for governmental purposes without the payment of any royalties thereon or therefor. Pursuant to 35 U.S.C. §119, the benefit of priority from provisional application 60/774,803, with a filing date of Feb. 6, 2006, is claimed for this non-provisional application.

BACKGROUND OF THE INVENTION

1. Field of the Invention

This invention relates to wireless sensing systems. On More specifically, the invention's a wireless sensing system that uses an open-circuit electrically-conductive spiral trace as the system's sensor.

2. Description of the Related Art wireless sensors and wireless sensor measurement acquisition systems are known in the art. For example, U.S. Pat. Nos. 7,086,593 and 7,159,774 disclose magnetic field response sensors designed as passive inductor-capacitor circuits and passive inductor-capacitor-resistor circuits that produce magnetic field responses whose harmonic frequencies correspond to states of physical properties of interest. A sensor is made by electrically connecting a spiral trace inductor to a capacitor. A magnetic field response recorder wirelessly transmits a time-varying magnetic field that powers each sensor using Faraday induction. Each sensor then electrically oscillates at a resonant frequency that is dependent upon the capacitance, inductance and resistance of each sensor. The frequency, amplitude and bandwidth of this oscillation is wirelessly sensed by the magnetic field response recorder. The sensor's response is indicative of one or more parameters that are to be measured.

While the above-described magnetic field response measurement acquisition system greatly improves the state-of-the-art of wireless sensing, sensor reliability is greatly improved by eliminating their electrical connections. Furthermore, a sensor design that can be readily modified to provide a different response characteristic would be desirable. In this way, sensors could be mass produced in one configuration and then quickly customized by a user for their particular application.

SUMMARY OF THE INVENTION

Accordingly, it is an object of the present invention to provide a wireless sensing system.

Another object of the present invention is to provide a wireless sensing system utilizing a simple sensor that is easy to fabricate and more reliable than existing designs.

Still another object of the present invention is to provide a magnetic field response-based wireless sensing system whose sensor can be readily adjusted in terms of its frequency response.

Other objects and advantages of the present invention will become more obvious hereinafter in the specification and drawings.

In accordance with the present invention, a wireless sensing system includes a sensor made from an electrical conductor having first and second ends and shaped to form a spiral between the first and second ends. The shaped conductor is an open-circuit having inductance and capacitance. In the presence of a time-varying magnetic field, the shaped conductor resonates to generate a harmonic response having a frequency, amplitude and bandwidth. A magnetic field response recorder wirelessly transmits the time-varying magnetic field to the shaped conductor and wirelessly detects its response frequency, amplitude and bandwidth.

DETAILED DESCRIPTION OF THE INVENTION

Figure 1:
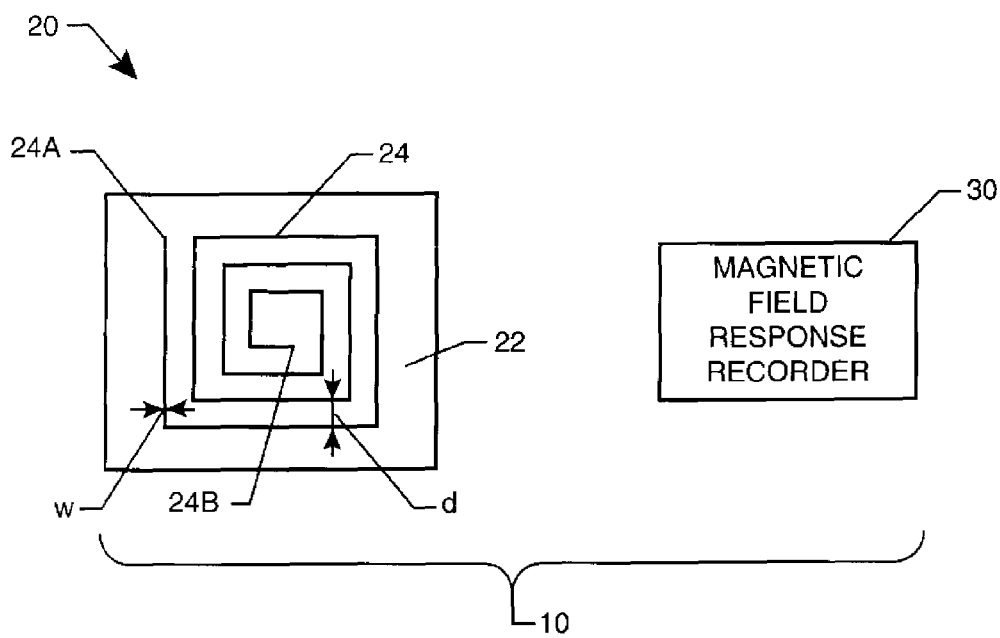
FIG. 1 is a schematic view of an open-circuit spiral trace sensor in accordance with an embodiment of the present invention.

Referring now to the drawings and more particularly to FIG. 1, a wireless sensing system using an open-circuit spiral trace sensor in accordance with an embodiment of the present invention is shown and is referenced generally by numeral 10. In general, system 10 includes a sensor assembly 20 and a magnetic field response recorder 30. Sensor assembly 20 will typically be attached to or incorporated in a structure, machine, environment, etc. (not shown), and designed to sense/measure some physical parameter of interest. It is to be understood that the particular mounting location and/or parameter(s) to be sensed are not limitations of the present invention.

Sensor assembly 20 typically includes a substrate material 22 that is electrically non-conductive and can be flexible to facilitate a variety of mounting scenarios. The particular choice of substrate material 22 will vary depending on the ultimate application incorporating sensor assembly 20. Accordingly, the choice of substrate material 22 is not a limitation of the present invention.

Deposited on substrate material 22 is a spiral trace sensor 24 made from an electrically-conductive run or trace. More specifically, spiral trace sensor 24 is a spiral winding of conductive material with its ends 24A and 24B remaining open or unconnected. Accordingly, spiral trace sensor 24 is said to be an open-circuit. Techniques used to deposit spiral trace sensor 24 on substrate material 22 can be any conventional metal-conductor deposition process to include thin-film fabrication techniques. In the illustrated embodiment, spiral trace sensor 24 is constructed to have a uniform trace width throughout (i.e., trace width W is constant) with uniform spacing (i.e., spacing d is constant) between adjacent portions of the spiral trace. However, as will be explained further below, the present invention is not limited to a uniform width conductor spirally wound with uniform spacing as illustrated in FIG. 1.

As is well known and accepted in the art, a spiral inductor is ideally constructed/configured to minimize parasitic capacitance so as not to influence other electrical components that will be electrically coupled thereto. This is typically achieved by increasing the spacing between adjacent conductive portions or runs of the conductive spiral trace. However, in the present invention, spiral trace sensor 24 is constructed/configured to have a relatively large parasitic capacitance. The capacitance of spiral trace sensor 24 is operatively coupled with the sensor's inductance such that energy can be exchanged between the sensor's magnetic field and its electric field. The amount of inductance along any portion of a conductive run of sensor 24 is directly related to the length thereof and inversely related to the width thereof. The amount of capacitance between portions of adjacent conductive runs of sensor 24 is directly related to the length by which the runs overlap each other and's inversely related to the spacing between the adjacent conductive runs. The amount of resistance along any portion of a conductive run of sensor 24 is directly related to the length and inversely related to the width of the portion. Total capacitance, total inductance and total resistance for spiral trace sensor 24 is determined simply by adding these values from the individual portions of sensor 24. The geometries of the various portions of the conductive runs of the sensor can be used to define the sensor's resonant frequency.

Spiral trace sensor 24 with its inductance operatively coupled to its capacitance defines a magnetic field response sensor. In the presence of a time-varying magnetic field, spiral trace sensor 24 electrically oscillates at a resonant frequency that is dependent upon the capacitance, inductance and resistance of spiral trace sensor 24. This oscillation occurs as the energy is harmonically transferred between the inductive portion of spiral trace sensor 24 (as magnetic energy) and the capacitive portion of sensor 24 (as electrical energy). In order to be readily detectable, the capacitance and inductance of spiral trace sensor 24 should be such that the amplitude of the sensor's harmonic response is at least 10 dB greater than any ambient noise where such harmonic response is being measured.

Figure 2:
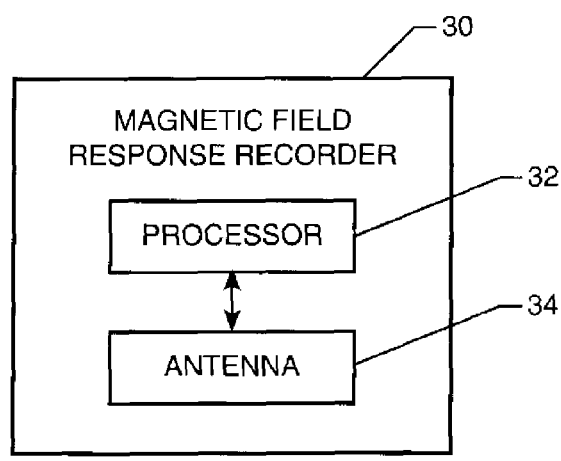
FIG. 2 is a schematic view of an embodiment of a magnetic field response recorder used in the present invention.

The application of the magnetic field to spiral trace sensor 24 as well as the reading of the induced harmonic response at a resonant frequency is accomplished by magnetic field response recorder 30. The operating principles and construction details of recorder 30 are provided in U.S. Pat. Nos. 7,086,593 and 7,159,774, the contents of which are hereby incorporated by reference. Briefly, as shown in FIG. 2, magnetic field response recorder 30 includes a processor 32 and a broadband radio frequency (RF) antenna 34 capable of transmitting and receiving RF energy. Processor 32 includes algorithms embodied in software for controlling antenna 34 and for analyzing the RF signals received from the magnetic field response sensor defined ay spiral trace sensor 24. On the transmission side, processor 32 modulates an input signal that is then supplied to antenna 34 so that antenna 34 produces either a broadband time-varying magnetic field or a single harmonic field. On the reception side, antenna 34 receives harmonic magnetic responses produced by spiral trace sensor 24. Antenna 34 can be realized by two separate antennas or a single antenna that is switched between transmission and reception.

Figure 3:
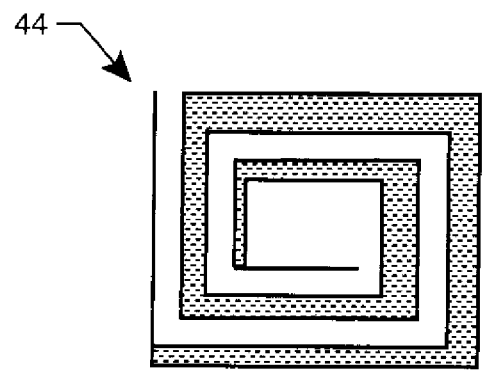
FIG. 3 is a schematic view of a spiral trace sensor whose traces are non-uniform in width.
Figure 4:
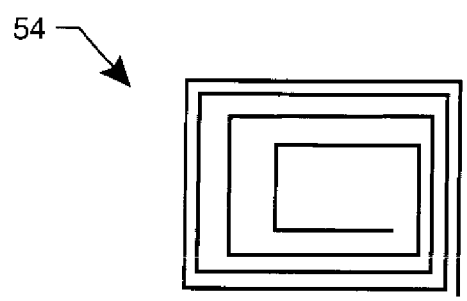
FIG. 4 is a schematic view of a spiral trace sensor having non-uniform spacing between the traces thereof.
Figure 5:
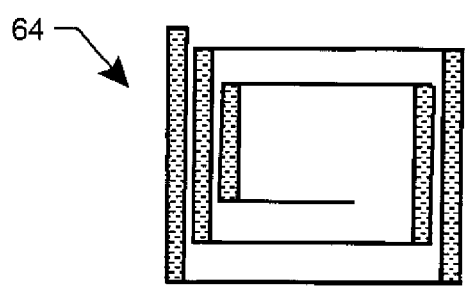
FIG. 5 is a schematic view of a spiral trace sensor having non-uniform trace width and non-uniform trace spacing.

As mentioned above, both the width of the spiral trace sensor's conductive trace and the spacing between adjacent portions of the conductive trace can be uniform as shown in FIG. 1. However, the present invention is not so limited. For example, FIG. 3 illustrates a spiral trace sensor 44 in which the width of the conductive trace is non-uniform while the spacing between adjacent portions of the conductive trace is uniform. FIG. 4 illustrates a spiral trace sensor 54 in which the width of the conductive trace is uniform, but the spacing between adjacent portions of the conductive trace is non-uniform. Finally, FIG. 5 illustrates a spiral trace sensor 64 having both a non-uniform width conductive trace and non-uniform spacing between adjacent portions of the conductive trace.

Figure 6A:
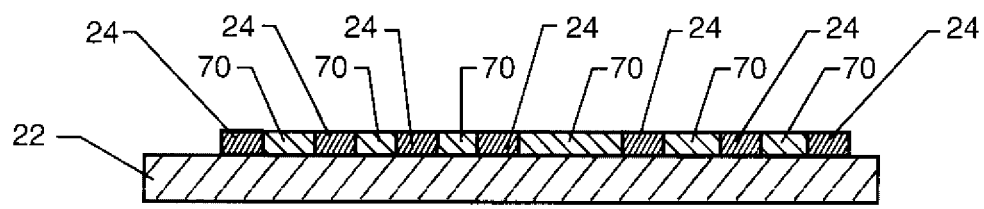
FIG. 6A is a cross-sectional view of a spiral trace sensor assembly with a dielectric material disposed between the sensor's traces.
Figure 6B:
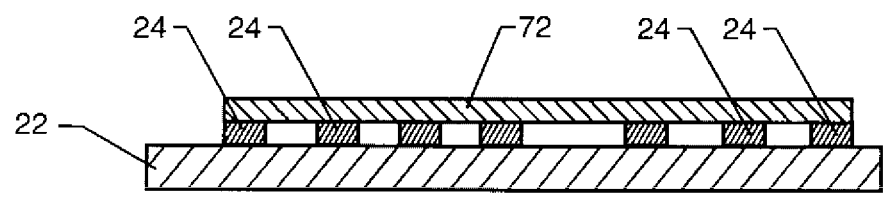
FIG. 6B is a cross-sectional view of a spiral trace sensor assembly with a dielectric material layer disposed on top of the spiral trace.
Figure 6C:
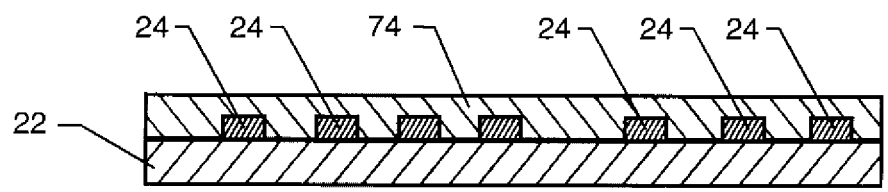
FIG. 6C is a cross-sectional view of a spiral trace sensor assembly with a dielectric material disposed between the sensor's traces and on top of the spiral trace.

As described above, the length/width of the conductive trace and the spacing between adjacent portions of the conductive trace determine the capacitance, inductance and resistance (and, therefore, the resonant frequency) of a spiral trace sensor in the present invention. In addition, the sensor's resonant frequency can be modified by providing a dielectric material (i) between adjacent portions of the spiral trace sensor's conductive trace, and/or (ii) on top of the spiral trace. This is illustrated in FIGS. 6A-6C where a cross-sectional view of a sensor assembly in accordance with the present invention (e.g., sensor assembly 20 in FIG. 1) has been modified by adding a dielectric material thereto. For example, in FIG. 6A, a dielectric material 70 is added between the conductive traces of spiral trace sensor 24 in FIG. 6B, a dielectric material 72 is overlaid as a layer on top of spiral trace sensor 24. Finally, in FIG. 6C, a dielectric material 74 is added between the conductive traces of spiral trace sensor 24 as well as top thereof so that substrate material 22 and dielectric material 74 effectively encase spiral trace sensor 24.

The advantages of the present invention are numerous. The low profile magnetic field response sensor has a smaller profile than previous designs as no separate capacitor is required. This eliminates the need for a separate capacitor as well as the electrical connection between an inductor and capacitor. This makes the sensor easy to fabricate as a simple electrically-conductive trace. The resonant frequency response is easily adjusted by modifying the length of the spiral conductor. For example, a 24×18 inch spiral trace sensor with uniform 0.080 inch width traces and uniform spacing of 0.005 inches yields a response of 0.9 MHz. The resonant frequency was boosted to 6.0 MHz simply by cutting the circuit to a 5×9 inch area. Thus, the present invention is well suited to be manufactured to a standard size with subsequent simple modification for a specific application.

Previously-cited U.S. Pat. Nos. 7,086,593 and 7,159,774 discuss methods by which multiple sensors can be interrogated provided that they are within the magnetic field of the magnetic field response recorder and their response is large enough to be received by the response recorder. By means of inductive coupling, an arrangement of sensors discussed herein in close enough proximity to be inductively coupled to each other allows the measurement of each sensor to be interrogated by a magnetic field response recorder without the recorder's magnetic field directly interrogating each sensor. That is, just one sensor is powered directly by the recorder, and the recorder directly receives the response (for the whole arrangement) from this sensor. The remaining sensors in the arrangement are communicated via inductive coupling as their response is superimposed upon that of the sensor being powered and interrogated directly. Hence, the sensor being directly powered/interrogated has a response containing the resonant responses of all sensors in the arrangement that are inductively coupled thereto. Each response can be correlated to the magnitude of one or more physical quantities. Two simple sensing arrangements illustrating this concept are shown in FIGS. 7A and 7B.

Figure 7A:
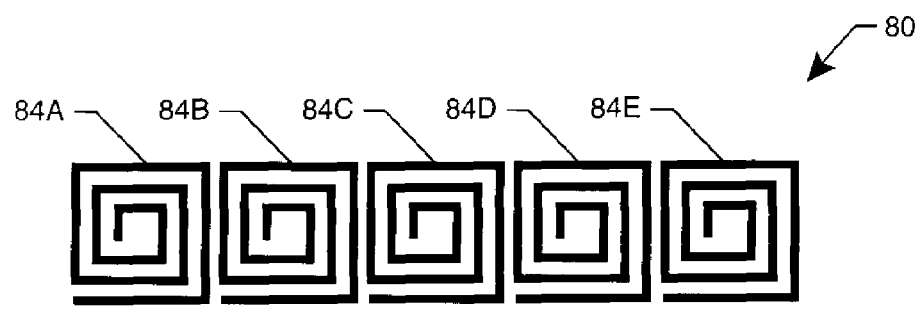
FIG. 7A is a schematic view of a linear arrangement of open-circuit spiral trace sensors mutually inductively coupled and interrogated by a magnetic field response recorder.
Figure 7B:
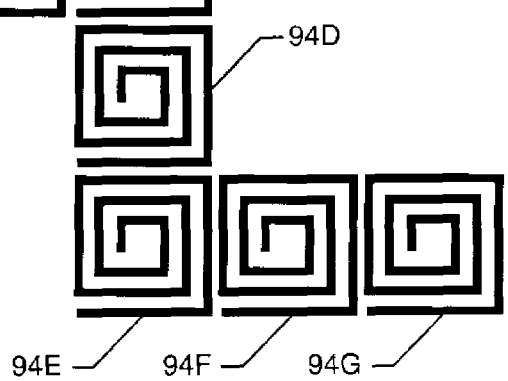
FIG. 7B is a schematic view of a non-linear arrangement of open-circuit spiral trace sensors mutually inductively coupled and interrogated by a magnetic field response recorder.

FIG. 7A illustrates an arrangement 80 of spiral trace sensors 84A-84E all aligned in a row. Response recorder 30 is positioned to power and receive responses from sensor 84A. Because all the sensors are inductively coupled, their response will be superimposed upon the response of sensor 84A via inductive coupling. Each sensor is designed so that its frequency does not overlap that of any other sensor. If any sensor in the array should have its response change (as a result of the change in a physical quantity that it is measuring), the change will manifest itself in the frequency response of sensor 84A. FIG. 7B illustrates an arrangement 90 of spiral trace sensors 94A-94G not aligned in a row. That is, the previously described approach of powering/interrogating an arrangement sensors via inductive coupling does not require that the sensors be aligned in any particular arrangement. The only requirement for interrogating the sensors via inductive coupling is that the relative position of the sensors remain fixed.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

The invention claimed is:

1. A wireless sensing system, comprising:
an electrical conductor having first and second ends and shaped to form a spiral between said first and second ends, said first and second ends remaining electrically unconnected such that said conductor so-shaped is maintained as an unconnected single-component open-circuit having inductance and capacitance wherein, in the presence of a time-varying magnetic field, said conductor so-shaped resonates to generate a harmonic magnetic field response having a frequency, amplitude and bandwidth; and
a magnetic field response recorder for wirelessly transmitting said time-varying magnetic field to said conductor so-shaped and for wirelessly detecting said frequency, amplitude and bandwidth.

2. A wireless sensing system as in claim 1 wherein said conductor comprises a thin-film trace.

3. A wireless sensing system as in claim 2 wherein said trace is uniform in width.

4. A wireless sensing system as in claim 2 wherein spacing between adjacent portions of said trace is uniform.

5. A wireless sensing system as in claim 2 wherein said trace is non-uniform in width.

6. A wireless sensing system as in claim 2 wherein spacing between adjacent portions of said trace is non-uniform.

7. A wireless sensing system as in claim 1 wherein said conductor is configured to affect said capacitance and inductance in a way that makes said amplitude at least 10 dB more than an amplitude of ambient noise at said magnetic field response recorder.

8. A wireless sensing system as in claim 1 further comprising a dielectric material disposed between adjacent portions of said conductor.

9. A wireless sensing system as in claim 1 further comprising a dielectric material disposed on said conductor.

10. A wireless sensing system as in claim 1 further comprising a dielectric material disposed between adjacent portions of said conductor and on said conductor.

11. A wireless sensing system. comprising:
a non-conductive substrate;
an open-circuit electrically-conductive spiral trace deposited on said substrate, said spiral trace maintained as a single component having two electrically unconnected ends, said spiral trace further having inductance and capacitance that (i) allows said spiral trace to generate a harmonic magnetic field response having a frequency, amplitude and bandwidth in the presence of a time-varying magnetic field, and (ii) causes said amplitude to be at least 10 dB more than ambient noise; and
a magnetic field response recorder for wirelessly transmitting said time-varying magnetic field to said spiral trace and for wirelessly detecting said frequency, amplitude and bandwidth.

12. A sensing system as in claim 11 wherein said substrate is flexible.

13. A wireless sensing system as in claim 11 wherein said spiral race is uniform in width.

14. A wireless sensing system as in claim 11 wherein spacing between adjacent portions of said spiral trace is uniform.

15. A wireless sensing system as in claim 11 wherein said spiral trace is non-uniform in width.

16. A wireless sensing system as in claim 11 wherein spacing between adjacent portions of said spiral trace is non-uniform.

17. A wireless sensing system as in claim 11 further comprising a dielectric material disposed between adjacent portions of said spiral trace.

18. A wireless sensing system as in claim 11 further comprising a dielectric material disposed on said spiral trace.

19. A wireless sensing system as in claim 11 further comprising a dielectric material disposed between adjacent portions of said spiral trace and on said spiral trace.

20. A wireless sensing system, comprising:
a non-conductive, flexible substrate;
an open-circuit electrically-conductive spiral trace deposited on said substrate, said spiral trace maintained as a single component having two electrically unconnected ends, said spiral trace further having inductance and capacitance that (i) allows said spiral trace to generate a harmonic magnetic field response having a frequency, amplitude and bandwidth in the presence of a time-varying magnetic field, and (ii) causes said amplitude to be at least 10 dB more than ambient noise;
a dielectric material disposed between adjacent portions of said spiral trace and on said spiral trace wherein said spiral trace is encased by said substrate and said dielectric material; and
a magnetic field response recorder for wirelessly transmitting said time-varying magnetic field to said spiral trace and for wirelessly detecting said frequency, amplitude and bandwidth.

21. A wireless sensing system as in claim 20 wherein said spiral trace is uniform in width.

22. A wireless sensing system as in claim 20 wherein spacing between adjacent portions of said spiral trace is uniform.

23. A wireless sensing system as in claim 20 wherein said spiral trace is non-uniform in width.

24. A wireless sensing system as in claim 20 wherein spacing between adjacent portions of said spiral trace is non-uniform.

25. A wireless sensing system, comprising:
- an arrangement of inductively coupled sensors, wherein said arrangement is fixed;
- each said sensor being an electrical conductor having first and second ends that are electrically unconnected, said conductor shaped to form a spiral between said first and second ends wherein said conductor is maintained as an unconnected single-component open-circuit having inductance and capacitance;
- at least one said sensor directly powered and interrogated by a time-varying magnetic field, wherein said sensor directly powered and interrogated resonates to generate one or more harmonic responses each having a frequency, amplitude, and bandwidth resulting from resonant responses of said inductively coupled arrangement of sensors;
- said responses of said arrangement of sensors correlated to the magnitude of one or more physical quantities; and
- a magnetic field response recorder for (i) wirelessly transmitting said time-varying magnetic field to said sensor directly powered and interrogated and (ii) for wirelessly detecting said frequencies, amplitudes and bandwidths of all said arranged sensors.

26. A wireless sensing system as in claim 25 wherein each said conductor comprises a thin-film trace.

27. A wireless sensing system as in claim 26 wherein said traces are uniform in width.

28. A wireless sensing system as in claim 26 wherein spacing between adjacent portions of said traces is uniform.

29. A wireless sensing system as in claim 26 wherein said traces are non-uniform in width.

30. A wireless sensing system as in claim 26 wherein spacing between adjacent portions of said traces is non-uniform.

31. A wireless sensing system as in claim 25 wherein said conductors are configured to affect said capacitance and inductance in a way that makes said amplitudes at least 10 dB more than an amplitude of ambient noise at said magnetic field response recorder.

32. A wireless sensing system as in claim 25 further comprising a dielectric material disposed between adjacent portions of at least one of said conductors.

33. A wireless sensing system as in claim 25 further comprising a dielectric material disposed on at least one of said conductors.

34. A wireless sensing system as in claim 25 further comprising a dielectric material disposed between adjacent portions of at least one of said conductors and on at least one of said conductors.

35. A wireless sensing system as in claim 25 wherein said arrangement of sensors is deposited on a non-conductive substrate.

* * * * *